United States Patent [19]

Domash

[11] Patent Number: 5,144,690
[45] Date of Patent: Sep. 1, 1992

[54] OPTICAL FIBER SENSOR WITH LOCALIZED SENSING REGIONS

[75] Inventor: Lawrence H. Domash, Arlington, Mass.

[73] Assignee: Corning Incorporated, Corning, N.Y.

[21] Appl. No.: 621,749

[22] Filed: Dec. 3, 1990

[51] Int. Cl.$^5$ .............................. G02B 6/22
[52] U.S. Cl. ...................... 385/12; 385/126
[58] Field of Search .......... 350/96.15, 96.29, 96.33; 385/12, 13, 122, 126

[56] References Cited

U.S. PATENT DOCUMENTS

| | | | |
|---|---|---|---|
| 4,134,642 | 1/1979 | Kapron et al. | 350/96.33 |
| 4,217,488 | 8/1980 | Hubbard | 350/96.33 X |
| 4,295,738 | 10/1981 | Meltz et al. | 356/32 |
| 4,295,739 | 10/1981 | Meltz et al. | 356/32 X |
| 4,394,062 | 7/1983 | Scheneider | 350/96.33 |
| 4,410,236 | 10/1983 | Schiffner | 350/96.33 |
| 4,478,489 | 10/1984 | Blankenship et al. | 350/96.33 X |
| 4,770,492 | 9/1988 | Levin | 350/96.29 |
| 4,842,403 | 6/1989 | Tarbox et al. | 356/32 X |
| 4,871,221 | 10/1989 | Imoto | 350/96.29 X |
| 4,925,269 | 5/1990 | Scrivener | 350/96.15 X |

FOREIGN PATENT DOCUMENTS

| | | |
|---|---|---|
| 0175585 | 3/1986 | European Pat. Off. |
| 2198844A | 6/1988 | United Kingdom |
| 8100912 | 4/1981 | World Int. Prop. O. |

OTHER PUBLICATIONS

Patent Abstracts of Japan, vol. 11, No. 197 (P-589) Jun. 25, 1987.

Primary Examiner—John D. Lee
Assistant Examiner—Phan T. Heartney
Attorney, Agent, or Firm—W. J. Simmons, Jr.

[57] ABSTRACT

A coupling mechanism for a non-identical dual core optical fiber. The fiber is sensitized along selected portions of its length by coating the fiber in a pattern of bands of specified spacing with material that is sensitive to the presence of a predetermined parameter or environmental field. By virtue of inequality of propagation properties and mismatch of optical phase of the fields of the two cores, evanescent wave coupling is largely or wholly suppressed except in those portions of length coated in the specified spatially periodic manner. Optical power launched into one of the two cores remains propagating within that core alone over an extended length of the fiber, except for that period of time when the predetermined parameter or environmental field is sensed. The specific spatial periodicity of the pattern of coating bands on the outside of the fiber acts in concert with the nonidentical propagation parameters of the two cores to effect intercore coupling of optical energy. This coupling, representing sensitivity to any environmental field which causes strain in the coating, is effective only on those portions of the dual core fiber length which bear a specific coating pattern.

24 Claims, 4 Drawing Sheets

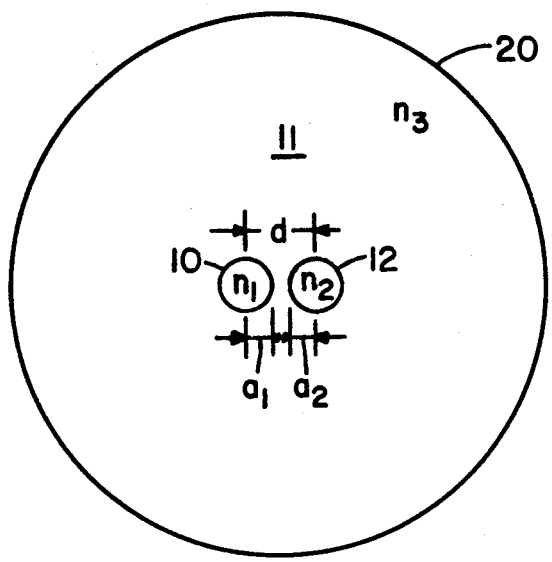
Fig. 2
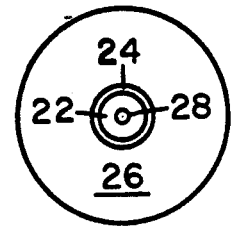
Fig. 3a
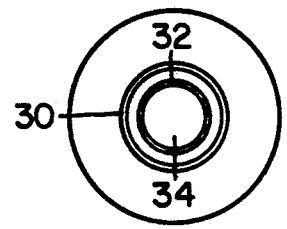
Fig. 3b
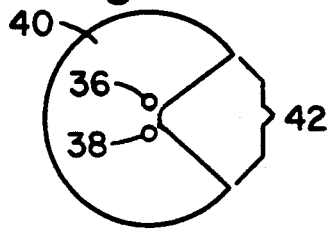
Fig. 3c
Fig. 5a
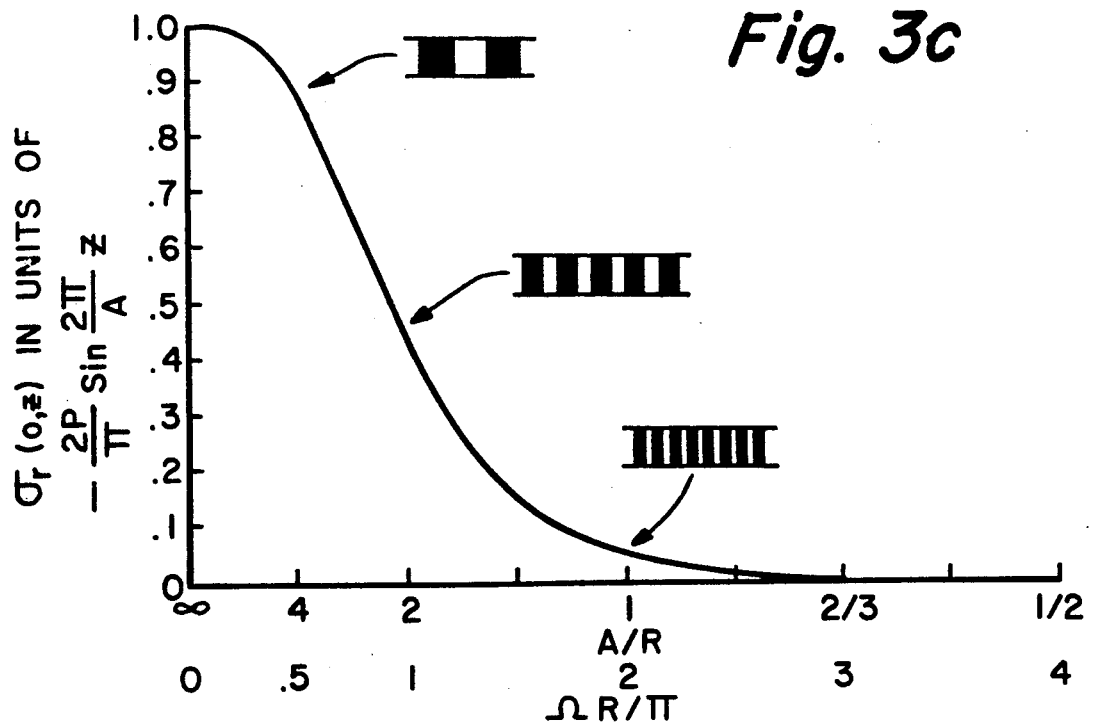

OPTICAL FIBER SENSOR WITH LOCALIZED SENSING REGIONS

BACKGROUND OF THE INVENTION

The present invention relates to optical fibers and, more particularly, to optical fiber sensors that measure physical parameters such as magnetic field, temperature, pressure, and the like.

Optical fibers are well known as conduits of optical energy whose primary use has been for the communication of information. A typical optical fiber of the simplest kind is a long filament comprising an inner transparent rod or core which may be glass or plastic, of a relatively high refractive index. The core is conventionally surrounded by a second region of relatively low refractive index, called the cladding. By virtue of the optical principle of mode propagation, light is conveyed along the length of this structure with relatively low loss of optical energy.

The term "core" refers generally to any guiding region of relatively high refractive index which may be located within the structure of the fiber. It need not be a cylindrical rod shaped region only. Rods of non-circular cross-section or ring shaped guiding regions are also known in the art. The essential electromagnetic properties with respect to the guiding of optical energy of all cross-section geometries are similar.

Optical fibers are also known which have structures encompassing two cores of relatively higher refractive index embedded within a single cladding of relatively lower index. Such fiber configurations are typically used for the purpose of dual channel communications or secure communications or as coupling or wavelength filtering devices. Dual core fibers may be in the form of two rod-type cores, or a rod core surrounded by a ring shaped second core, or two concentric ring cores, or any other combination of like or unlike cores of any geometrical cross-section incorporated within the same cladding structure.

While communications is the major application of optical fiber technology, interest has developed recently in another area: the use of the physical and optical properties of the fibers themselves to construct sensors, instruments or measurement devices. These sensors respond to conditions such as temperature, pressure, strain, fluid flow, magnetic or electric fields, or other parameters.

A number of different modes of the electromagnetic field propagated in the fiber can be controlled as a function of the diameter of the core, the wavelength of the light launched into it, and the values of the refractive indices of the core and cladding materials. It is possible to arrange these parameters so that only one mode is supported. Such single-mode fibers are useful for communications purposes, or more generally when it is desirable to utilize the interference properties of the electromagnetic fields in the fiber.

Heretofore, the most sensitive fiber optic sensing devices have been assemblages of single-mode optical fibers combined in some fashion to manifest phenomena of wave interference between the optical fields conveyed by two or more fibers. A laser source is generally divided into two parts initially and launched into two separated fibers.

U.S. Pat. No. 4,173,412 issued to Ramsay et al. discloses a sensor for measuring strain. The sensor operates on the principle that transverse straining of a single-mode fiber produces birefringence effects which can be observable using polarized light.

U.S. Pat. No. 4,295,738 issued to Meltz et al. discloses an optical fiber having two cores and being sensitive to strain or hydrostatic pressure through choice of materials, spacing and shape of the cores and cladding of the fiber. The strain or pressure change is measured by the relative intensity of light emerging from each core as a result of cross-talk between adjacent cores.

U.S. Pat. No. 4,295,739 issued to Meltz et al. discloses a multi core optical fiber having a plurality of cores in a common cladding which respond to either temperature or strain through choice of materials, spacing and shape of the cores of the fiber. The temperature strain or pressure change is measured by the relative intensity of light emerging from each core as a result of cross-talk between adjacent cores.

U.S. Pat. No. 4,151,747 issued to Gottlieb et al. discloses an arrangement for monitoring temperature. An optical fiber cooperates with a light source and a detector to sense changes in the temperature by monitoring the amount of light which passes through the fiber.

The foregoing references all disclose devices in which one fiber is subjected to influences by means of which external environmental fields alter the phase of the optical field within the fiber.

Also, it is known that certain coating materials applied to the outside of single-mode optical fibers can transduce environmental conditions such as pressure or magnetic or electric fields into strains in such fibers, thereby modulating the optical phase and resulting in fiber optic sensing of said conditions. As another example, temperature sensitivity can be enhanced by coating fibers with metallic films.

Optical interferometry has not been widely applied to manufactured devices because of a need for complex and highly precise mechanisms that are stable to within a fraction of one light wavelength. Single-mode optical fibers, as exemplified by devices such as interferometric fiber optic sensors, offer a means to package and miniaturize the techniques of interference of light waves.

Interferometric fiber optic sensors constructed from combinations of two or more separate optical fibers are subject to disadvantages. They are susceptible to mechanical vibration and thermal gradients among their several parts.

An improved class of devices can be designed by incorporating the two elements of a fiber interferometric device in the form of a dual core optical fiber. If two parallel cores of equal propagation constants are placed sufficiently close together, the electromagnetic fields propagating in each overlap in the cladding region, causing an interaction between cores known as evanescent wave coupling.

The aforementioned U.S. Pat. Nos. 4,295,738 and 4,295,739 issued to Meltz et al. and U.S. Pat. No. 4,151,747 issued to Gottlieb et al. disclose devices which take advantage of the process of evanescent wave coupling between the cores of a dual core fiber to manifest an optical fiber sensor of temperature or strain within the structure of a single fiber. A dual core evanescent wave device is a differential interferometer. Such devices are simpler and inherently more stable than fiber interferometers involving two fibers. Optical power is launched into one of the two cores. Evanescent wave coupling along the entire length of the dual core structure acts to produce a transfer of light to the second core and then back to the first, in a periodic manner characterized by a beat length which reflects the strength of the interaction. Since beat length is sensitive to temperature and strain of the fiber, it may be used to sense or measure these parameters. In the referenced prior art, the dual or multiple cores all have identical propagation constants. Such cores are said to be phase matched, allowing light energy to couple between the cores.

Dual core evanescent wave fiber optic sensors with phase matched cores are subject to a number of limitations. First, only temperature and strain can be measured. Second, the evanescent wave coupling action and hence the sensitivity of the dual core structure acts along the entire length of the fiber. The conveyance of optical power to and from the sensor is accomplished by joining the structure to a number of conventional single core fibers acting as leads. These connections are usually accomplished by means of various connectors and joints which may complicate the use of the device and decrease efficiency thereof.

It would be advantageous to provide a sensitive fiber in which the type and location of sensitivity to external influences could be controlled and restricted to portions of the length so that separate leads were not required.

It would still further be advantageous to provide an optical fiber in which a plurality of locally sensitized areas can be disposed along the same fiber, each area being sensitive to different environmental effects.

SUMMARY OF THE INVENTION

In accordance with the present invention, there is provided a coupling mechanism for a non-identical dual core fiber. The desired sensitivity can be localized to selected lengths of the fiber and can include any external condition or field which can affect a sensitive coating.

The dual core fiber is fabricated with a choice of geometrical parameters and refractive indices to meet two criteria. First, the two cores are placed in sufficiently close proximity that, were they to have identical propagation constants, evanescent wave coupling would act to produce strong interchange of optical energy from core to core. Second, some core parameters such as the refractive indices thereof are adjusted so that the propagation constants of the two cores are unequal. By virtue of this inequality of propagation properties and the mismatch of optical phase of the fields of the two cores, evanescent wave coupling is largely or wholly suppressed. Optical power launched into one of the two cores remains propagating within that core alone over an extended length of the fiber. Transfer of optical power to the second core is inhibited by detuning or phase mismatch so that each core acts like a separate and independent optical fiber.

The fiber is sensitized along selected portions of its length by coating the fiber with material that is sensitive to the presence of a predetermined parameter or environmental field. The term "sensitive" means that the material has the property of undergoing dimensional alteration (e.g., contraction, expansion, shear, change of shape, or any other mechanical deformation) in the presence of the field of interest.

Representative sensitive coating materials include magnetostrictive material (e.g., nickel, iron alloys or metallic glasses); piezoelectric or electrostrictive materials sensitive to the presence of electric fields; aluminum and other heat-conductive materials; and plastic coatings sensitive to variations in static pressure or oscillating pressure, such as occurs in sound waves.

The coating material is to be applied not in a continuous coating but rather in the form of a pattern of axial bands or stripes whose periodicity along the length of the dual-core fiber have been precisely determined in relation to the specific characteristics of the dual core fiber in use. The essence of the invention lies in the interaction between the nonidentical dual core structure and the spatially periodic form of the coatings. These two features act together to produce the phenomenon of localized sensing activity.

BRIEF DESCRIPTION OF THE DRAWINGS

A complete understanding of the present invention may be obtained by reference to the accompanying drawings, when taken in conjunction with the detailed description thereof and in which:

FIG. 2 illustrates in greater detail the sectional geometry of one embodiment of a dual core optical fiber;

FIGS. 3a through 3c illustrate, in axial section, examples of various internal geometries of an optical fiber with two guiding regions;

FIGS. 5a and 5b are graphs illustrating example calculations of the effectiveness of penetration of periodic strain components from the fiber surface to the fiber center as a function of the ratio A/R, where A is the axial periodicity of the coating bands and R is the fiber outer radius.

DESCRIPTION OF THE PREFERRED EMBODIMENT

Figure 1:
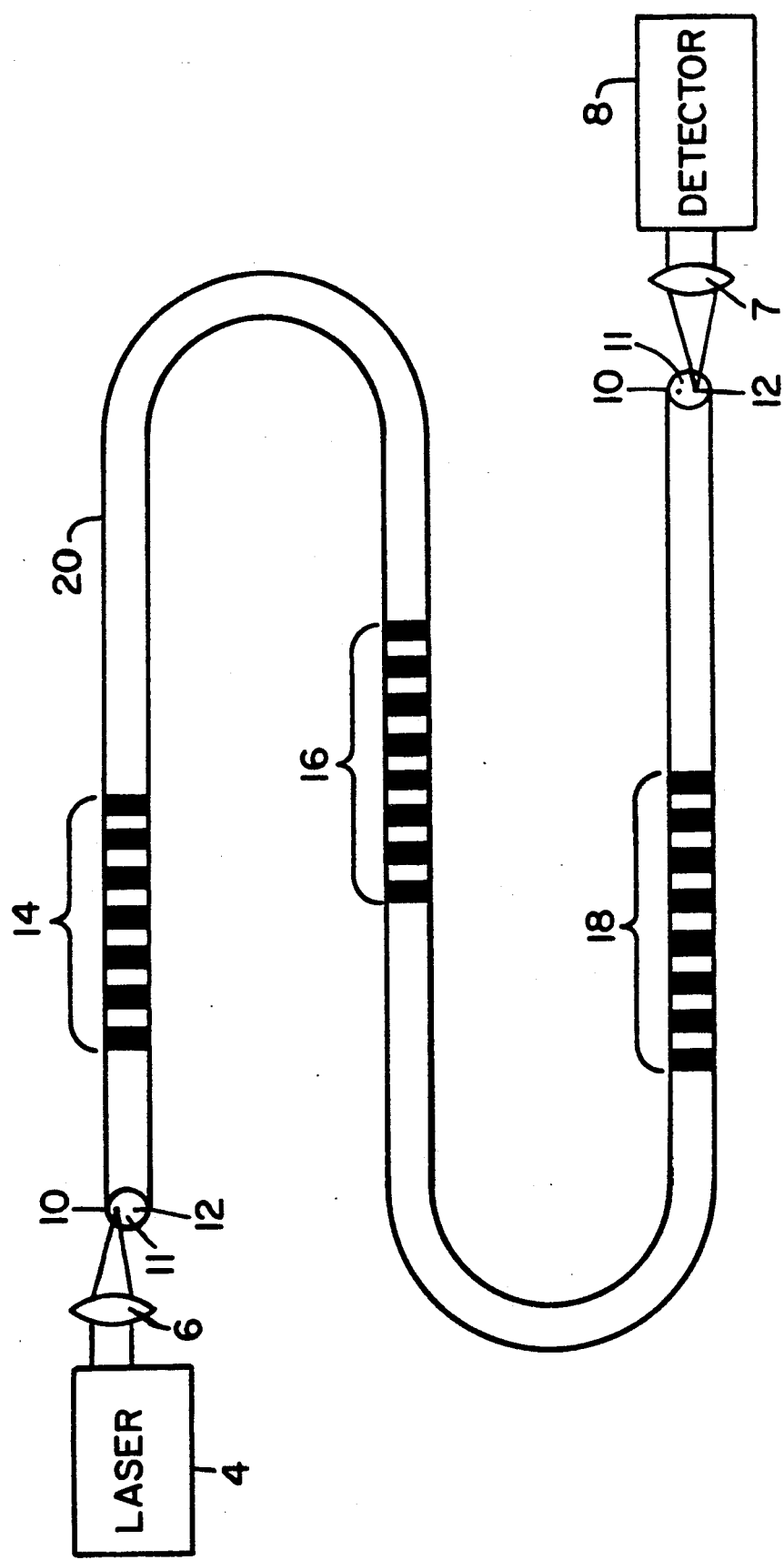
FIG. 1 illustrates schematically, in an exploded view, an example of a dual core optical fiber system incorporating discrete sensitive sections.

For purposes of the following description, it may be helpful to refer to "Theory of Dielectric Waveguides" by D. Marcuse, Academic Press, New York, 1974, for definitions of terms used herein and for a general discussion of light propagation in, and coupling of, optical fibers.

The field or parameter to be sensed is referred to herein generically as "F".

The coupling mechanism of the invention is produced by virtue of depositing sensitive coating on the outer surface of a dual core optical fiber in a specific geometrical pattern. In the preferred embodiment, a periodic pattern of circular bands is used in a regular series characterized by a periodicity A (measured in units of bands per millimeter) along the longitudinal axis of the fiber. The periodic pattern of bands then acts to produce coupling between the optical power in the two cores.

In the presence of a change in the field F, the bands of sensitive coating deform and communicate a degree of distortion to the optical fiber upon which they are deposited. In accordance with the well-known elastic properties of glass, the dual core fiber thereby undergoes a local pattern of elastic deformations. The elastic deformation penetrates from the surface of the fiber to the region of the cores in the interior. This spatially periodic deformation produces a spatially periodic modulation of the refractive index of the glass in the cores and in the cladding around them. In addition, a small periodic variation is produced in the intercore spacing. Both of these effects contribute to a periodic spatial perturbation in the waveguiding environment of the electromagnetic fields in the two cores.

If a periodic variation is at a spatial periodicity A which resonantly matches the difference in core propagation constants $b_i$ according to the formula $$\frac{2\pi}{A} = b_1 - b_2$$

a resonant exchange of optical power is induced between the cores in direct proportion to the strength of the elastic deformation at the surface of the fiber and thus to the field F. By this mechanism, the presence of the field F or any change therein influences the transfer of optical power from the core into which it has been launched to the second core.

Optical power transfer occurs according to a rule of exchange characterized by a beat length, defined as the length over which 100% intercore energy transfer is effected. This process of interaction continues along the length of fiber that has been coated with sensitive material in the specific resonant periodicity A. The balance of optical powers exiting the two cores is responsive to the strength of the field F. The device as a whole thus constitutes a sensor with respect to field F.

In practice, optical power is launched into the first of two cores and remains confined to that core, propagating without transfer until impinging upon a section of fiber coated with the specified pattern of bands. Within that section, sensing action takes place under the influence of field F, resulting in the transfer of optical power between cores. Following the coated section, optical power is divided between the first and second cores, and continues to propagate through the remaining uncoated portion of fiber without further transfer of optical energy.

Sections of fiber which are uncoated, or are continuously coated, or are coated in a pattern of bands of periodicity substantially different from the resonant value defined above, will not react to F by transferring light energy between the cores. Thus the sensitive regions of fiber length are restricted to those portions coated with bands of one specific periodicity only; all other portions remain insensitive.

An arrangement of detectors is established downstream to measure the relative quantity of optical power in the two cores. Thus the periodically coated portion of fiber acts as a sensor, and the uncoated portions before and after the coated portion act as passive optical leads which convey light from a source and to detectors without further altering the balance of optical power between cores.

It should be understood that more than one coated section can be disposed at various locations along the fiber, separated by an arbitrary length of uncoated fiber. The uncoated portions act as passive lead material connecting the various sensing regions on a linear multisensor array. Such multiple sensitive sections of coated fiber may be fabricated from the same coating material to result in the same type of sensitivity. Likewise, the sections may be coated each with a different material, providing each coated section with different sensitivity. Moreover, a fiber may be produced with any mixture, combination or permutation of such sections.

Referring now to FIG. 1, there is shown a system for coupling light to a fiber optic cable. In view of the closeness of two cores 10, 12 a lens system is needed to couple a light source to a core. A laser 4 produces light to be conveyed down a fiber optic cable 20. A lens 6 is provided to focus light from laser 4 and couple the light to core 10, which is disposed at the focal point of the lens 6. Within optical fiber 20 is a cladding 11. Cores 10 and 12 may be identical or non-identical waveguides of any cross-sectional shape, as for example two parallel rods, a rod combined with a ring, two rings, or any other geometry such as cores of elliptical or triangular cross-section, and the like. In the preferred embodiment, a glass fiber 20 is fabricated with two single-mode cores 10, 12 placed parallel with respect to one another and separated by a distance of between 2 and 5 core radii. Whatever the cross-sectional geometry, it is in all cases possible by appropriate choice of the dimensions and refractive index of the core in relation to the cladding index, to design such core waveguides, considered individually, to propagate only a single mode of the electromagnetic field. Such cores are said to be "single-mode waveguides". A detector 8 is provided at the other end of fiber optic cable 20 to detect light which has been coupled with core 12 from core 10 within the fiber optic cable 20. A second lens 7 is provided to couple light from core 12 to detector 8.

As is known, evanescent wave coupling between adjacent cores takes place if two conditions are satisfied: the cores must be identical or nearly identical in propagation constant, and the cores must be in sufficiently close physical proximity so that the electromagnetic fields of the two waveguides overlap substantially.

If the waveguide incorporates two cores, then Maxwell's equations may be solved for the dual core structure as a whole. However, it is normally adequate to apply an approximation method known as coupled-mode theory. That is, two parallel cores may be considered independent entities between which energy may be exchanged by coupling. The axial dependence of any vectorial component of the electric field propagated by a single-mode core may be represented as $e^{ibz}$, where b is the axial (or longitudinal) propagation constant found by solving Maxwell's equations for the particular guide in question. In the case of step index cores, $$b = \kappa n_1 \sqrt{1 - 2\Delta(U^2/V^2)} \quad \text{(Eq. 1)}$$

where $$\kappa = \sqrt{\frac{2\sqrt{\epsilon/\mu}}{\pi a^2 bk}} \frac{W}{V} \frac{1}{|J_1(U)|}$$

$$V = \frac{2\pi a}{\lambda} \sqrt{n_1^2 - n_3^2} = \frac{2\pi a}{\lambda} (NA)$$

$$U = (1 + \sqrt{2})V[1 + (4 + V^4)^{\frac{1}{4}}]^{-1}$$

$$W = \sqrt{V^2 - U^2}$$

and where $\Delta = (n_1 - n_3)/n_1$, $k = 2\pi/\lambda$, $\lambda$ is the free space wavelength, a is the core radius, and $J_1$ is a Bessel function of order 1. Two adjacent cores are then characterized by their respective propagation constants, $b_1$ and $b_2$.

To understand the physical principles of dual core fibers, it is helpful to begin with the example of two identical parallel round cores. In this case it is possible to solve analytically for the coupling constant. If optical power $P_0$ is launched into one of the two cores 10 at one end of a dual core fiber 20, the optical power $P_1$ present in the second core 12 at any position along the length of the dual core fiber 20 is:

$$P_1 = P_0 \sin^2(cz)$$

where $$c = \frac{\lambda}{2\pi n_1} \frac{U^2}{a^2 V^2} \frac{K_0(Wd/a)}{K_1^2(W)} = \frac{\pi}{2\lambda_b^o} \quad \text{(Eq. 2)}$$

where d is the distance between core centers and $K_0$ and $K_1$ are modified Bessel functions.

Here c represents the coupling strength due to the evanescent wave interaction between the cores and depends on their geometry and refractive indices and particularly upon the distance between them. Coupling strength c decreases in an approximately exponential fashion as the distance between cores 10, 12 is increased.

The present invention utilizes two parallel waveguides 10, 12 of unequal propagation constants so that evanescent wave coupling is suppressed. This requires a generalization of the coupled mode equations to compute the optical power coupled from core 1 to 2 or vice versa. Once again the coupling coefficients $c_{12}$ and $c_{21}$ may be calculated in closed form for the case of dual parallel rod cores, leading to closed form expressions as stated in McIntyre and Snider (Journal of the Optical Society of America, vol. 63, p.1518, 1973).

For the purposes of the present invention, it is desirable that coupling between the cores 10, 12 of dual core fiber 20 be suppressed in the absence of a sensitive coating, so that dual core fiber 20 may act as optical leads to convey optical power within one 10 or the other 12 of the two cores to and from such specific regions as may be sensitized to selected external influences. Hence, the sensor fiber of the present invention is a dual core optical fiber 20 of any geometry with a significant difference in core propagation constants, resulting in a relative absence of intercore coupling.

If, according to the understanding developed above, a dual core optical fiber 20 is fabricated so that propagation constant $b_1$ is different than $b_2$, the two cores 10, 12 will not couple even if coupling strength c is relatively large (as may be due, for example, to close proximity between the cores). Optical power launched into core 10 will remain propagating in that core without exchange to core 12.

If optical power $P_0$ is launched into core 10 at $z=0$, (i.e., at the origin of the fiber 20) then the power in core 12 at another displaced position z units from the origin is given by $$P_1 = P_0 R \sin^2\left(\frac{|c_{12}c_{21}|^{\frac{1}{2}}}{\sqrt{R}} z\right) \quad \text{(Eq. 3)}$$

The $c_{12}$ and $c_{21}$ symbols represent the coupling coefficient between cores where $c_{12}$ equals the coupling coefficient between core 10 and core 12 and $c_{21}$ equals the coupling coefficient between core 12 and core 10. The coupling length is now $$\lambda_b = \frac{\pi}{2|c_{12}c_{21}|^{\frac{1}{2}}\sqrt{R}} \quad \text{(Eq. 4)}$$

and the maximum fraction of energy transferred at any point is $$R = \frac{1}{1 + \left(\frac{\Delta b}{2|c_{12}c_{21}|^{\frac{1}{2}}}\right)^2} \quad \text{(Eq. 5)}$$

This expression represents a standard Lorentzian resonance curve centered around $\Delta b = 0$. If $\Delta b$ is considered the independent variable, the full width at half maximum of this resonance is $2|c_{12}c_{21}|^{\frac{1}{2}}$.

These expressions illustrate that the coupling between cores is an optical resonance phenomenon. Unless the difference in propagation constants, $\Delta b = b_1 - b_2$ is nearly zero, very little energy transfer between cores takes place. Using typical fabrication parameters for core diameters and glass types and intercore spacing, it may be estimated that as little as 1% difference in core propagation constants results in suppression of intercore coupling by a factor of thousands. Moreover, if $\Delta b$ is a significant fraction of $|c_{12}c_{21}|^{\frac{1}{2}}$, then the spatial beat length will be small, for a rapid fluctuation of energy in the second core. Physically, this is due to the interference between phase mismatched modes. Coupling between non-identical cores is of small magnitude.

Referring now also to FIG. 2, there is shown a cross-sectional view of fiber 20. A dual core fiber 20 satisfying the condition $b_1 \neq b_2$ for non-coupling may be fabricated in any of a large number of different ways. For example, a dual core fiber 20 of the parallel rod-rod type may be fabricated with slightly different indices of refraction in the two cores, $n_1$ and $n_2$, but identical in all other respects. Alternatively, the same result may be achieved by two parallel rod-type cores of differing radii, $a_1$ and $a_2$, or by some combination of differences in indices or radii or some other parameter which may alter $b_1$ or $b_2$. Similar considerations may be applied to any other type of dual core fiber, whether of the rod-ring type, the ring-ring type, or some asymmetrical or non-circular geometry. In every case it is possible to design and fabricate each such core of such a waveguide, considered as an independent entity, to display a wide range of values of the propagation constant. Hence it is possible to design and fabricate a dual core fiber of any cross-sectional configuration to display any desired difference $b_1 - b_2$ as illustrated in FIGS. 3a-3c.

As illustrated in FIG. 3a, one cross-sectional configuration is the coaxial core fiber which has two additional parameters compared to parallel core 10, 12 (FIG. 2). In the ring waveguide, cores 24, 28 have different radii. Furthermore, inner cladding 22 and outer cladding 26 can have different refractive indices. The coaxial core fiber possesses cylindrical symmetry. The evanescent-wave region is larger and more evenly distributed in the coaxial core, an advantage to some embodiments of the invention.

FIG. 3b shows another cross-sectional configuration, the ring-to-ring dual core fiber, wherein both guiding regions 30, 32 are ring shaped. This configuration moves the evanescent-wave region 34 away from the center of the fiber and towards the surface, where it is more accessible to strains conveyed from coatings which decay rapidly with radial depth below the surface. This feature is advantageous in some embodiments.

The final cross-sectional configuration is a modification of parallel dual core (FIG. 2), illustrated in FIG. 3c. This is a modification not of the waveguide regions 36, 38, 40 as such, but of the mechanical stress focussing properties of the fiber. A dado-like cut 42 extends along the length of cladding 40. In this version, a relatively small distortion of the outer regions of the fiber is converted to a relatively large optical effect on the coupling.

Having established that non-identical dual cores do not substantially exchange light energy, it will now be shown that a coupling can be re-established by the method of introducing an axially periodic refractive index modulation in the fiber, such as results from the strain of a periodic coating.

For the purposes of the present invention, it is necessary to selectively establish coupling between the non-identical cores in a controlled fashion through periodic perturbations along desired portions of fiber.

As is well known in the art, consider the coupled mode equation $$da_1/dz = -ib_1 a_1 - ic_{12}a_2 \quad \text{(Eq. 6)}$$
$$da_2/dz = -ib_2 a_2 - ic_{21}a_1$$

for the interaction of non-identical cores and the coupling coefficient integral, $$c = \frac{1}{\lambda n_1} \int_{-\infty}^{\infty} \int dx\, dy (N^2 - n^2) \hat{E}_1^* \cdot \hat{E}_2 \quad \text{(Eq. 7)}$$

The coupling between parallel cores is due to a perturbation in the form of the second core's index profile. $N(x,y)$ represents the "perturbed" index consisting of both cores 10, 12 and cladding 11, and $n(x,y)$ represents the unperturbed index profile consisting of the first core 10 and cladding 11 only. The difference $N^2 - n^2$ is therefore the index profile within core 12 only, and the integral is carried out within the area inside core 12, not all the x,y plane.

Add to N an additional index profile $\delta n(x,y,z)$ representing a small induced modulation of refractive index which is periodic in the axial direction: $\delta n(x,y,z+A) = \delta n(x,y,z)$. The distribution of $\delta n$ in the transverse x,y plane is arbitrary, but the magnitude of $\delta n$ is everywhere very small: $|\delta n| << |N|$. $\delta n$ is the index modulation due to the strain induced in the fiber by a sensitive coating, described in greater detail hereinbelow.

At this point the periodic z dependence of $\delta n$ must be Fourier analyzed into its harmonic components at spatial frequencies $2\pi/A, 4\pi/A, 6\pi/A, \ldots$, consisting of sine and cosine series. It is assumed that a resonant coupling will take place involving one sharply defined spatial frequency. Thus, it is sufficient to extract from $\delta n(z)$ one harmonic component only. Moreover, it shall be demonstrated later that, regardless of the type of coating pattern applied at the surface of the fiber, only the fundamental spatial frequency survives in the stress reaching the center of the fiber. Thus the axial dependence of $\delta n$ can be represented as purely sinusoidal:

$$\delta n(x,y,z) \rightarrow \delta n(x,y,z) \sin \Omega z \quad \text{(Eq. 8)}$$

for $\Omega = 2\pi/A$.

The coupling coefficient is now sinusoidally z-dependent, with all x,y dependence under the integral:

$$c_{12}' = \sin \Omega z \frac{1}{\lambda n_1} \int\int dx\, dy\, \delta n(x,y) 2N \hat{E}_1^* \cdot \hat{E}_2 \quad \text{(Eq. 9)}$$

The above Eq. 9 for $c_{12}$ is quite generally applicable to dual core fibers of any geometrical configuration (rod-rod, rod-ring or ring-ring). The axial variation of the coupling is fixed, but the transverse distribution of the index perturbation is left arbitrary.

For purposes of the invention, this integral may be simplified further. The integral is to be carried out only over the transverse area inside (either) core. Since the core radius is a small fraction of the fiber radius, and since the index variation $\delta n(x,y)$ is slowly varying in the part of the fiber in which the core is embedded, $\delta n(x,y)$ may be replaced in the integral by its value at the core center.

Thus $\delta n(x,y)$ becomes simply an index modulation depth parameter, in terms of which $$c_{12}' = \sin \Omega z \frac{\delta n_o}{n_o} \frac{1}{\lambda n_1} \int\int dx\, dy\, 2n_o N(x,y) \hat{E}_1^* \cdot \hat{E}_2 \quad \text{(Eq. 10)}$$
$$= \sin \Omega z \frac{\delta n_o}{n_o} c_{12}$$

The integral here is recognized as the $c_{12}$ for the ordinary static coupling between two similar or dissimilar cores, giving the result that $$c'_{12} = \delta c_{12} \sin \Omega z \quad \text{(Eq. 11)}$$

where $\delta c_{12} = (\delta n_o/n_o)c_{12}$.

This simple result states that the coupling coefficient due to photoelastic modulation of the core index is the product of the original coupling coefficient between two identical or non-identical cores and a modulation depth parameter, with an overall sinusoidal z-dependence.

The preceding analysis assumes that the coupling between cores takes place by means of a strain induced photoelastic modulation of the refractive index in the cores. Next it must be recognized that a second coupling mechanism also contributes to the coupling: namely, a periodic strain induced modulation of the distance (separation parameter d/a) between the cores.

Periodic variations in the intercore separation may be taken into account mathematically either in the coordinates of the modal electric fields $E_1$ and $E_2$ so as to include a $\sin \Omega z$ oscillation in the effective core center, or by describing the core boundaries through an $N(x,y)$ profile which deviates from a cylinder with axially periodic serpentine bends of the core boundaries.

In either formulation, the resulting variation in coupling coefficient may be analyzed in a similar fashion to the photoelastic coupling mechanism just discussed, with the result that the contribution to the resonant coupling parameter due to strain induced modulation of intercore separation is $$c_{12}' = \sin \Omega z\, \delta c_{12} \quad \text{(Eq. 12)}$$

-continued $$\delta c_{12} = \frac{\partial c_{12}}{\partial(d/a)} \delta(d/a)$$

where $\delta c_{12}$ refers to differentiation with respect to $d/a$.

Combining Eq. 11 and Eq. 12 the result is the total coupling coefficient due to strain induced periodic perturbations of $$c_{12}' = \sin \Omega z (\delta_n c_{12} + \delta_{d/a} c_{12}) \quad \text{(Eq. 13)}$$
$$c_{12}' = \delta_{TOTAL}(c_{12}) \sin \Omega z$$

The previous results suggest that in all cases of practical interest, the cores differ in their propagation parameters by 1% or less; hence it is permissible to set $|c_{12}| \approx |c_{21}| = c$, the identical core coupling of Eq. 2. Alternatively, it may be interpreted that $c$ in what follows refers to the geometric mean $|c_{12}c_{21}|^{\frac{1}{2}}$, so that all equations are fully applicable to greater differences between cores.

Using this coupling coefficient in the coupled mode equations connecting core 10, mode $b_1$ to core 12, mode $b_2$ now gives:

$$\frac{da_1}{dz} = -ib_1 a_1 - i(\delta(c) \sin \Omega z) a_2 \quad \text{(Eq. 14)}$$

$$\frac{da_2}{dz} = -ib_2 a_2 - i(\delta(c) \sin \Omega z) a_1$$

The system of two coupled equations in Eq. 14 must now be solved. Because the coefficients of the cross terms are now $z$ dependent, an approximate solution is called for, using the "secular approximation method" known in quantum physics.

The result of such calculations show that the optical power coupled into the second core after a length $z$ of fiber perturbed at spatial frequency $\Omega$ through a coupling coefficient $\delta(c)$ is:

$$P_1(z) = P_0(0) R_\Omega \sin^2\left(\left[\frac{\delta(c)}{\sqrt{R_\Omega}}\right] z\right) \quad \text{(Eq. 15)}$$

where $R_\Omega = \dfrac{1}{1 + \dfrac{(\Omega - \Delta b)^2}{|\delta(c)|^2}}$

Once again, this represents resonance behavior. The resonant spatial frequency is $\Omega = b_1 - b_2$.

The beat length due to periodic index coupling, to be referred to henceforth as the dynamic beat length, is $$\lambda_b^D = \frac{\pi \sqrt{R_\Omega}}{\delta(c)} \quad \text{(Eq. 16)}$$

In the case of exact on-resonance coupling $\Omega = \Delta b$, the dynamic beat length becomes simply $$\lambda_b^D = \frac{\pi}{\delta(c)} \quad \text{(Eq. 17)}$$

To summarize the phenomenon just analyzed, two parallel signal mode waveguides of different propagation constants do not ordinarily exchange energy. If however the index of refraction of both guides is perturbed by a periodic axial modulation, coupling takes place. The percentage of energy transferred depends on the periodicity of the modulation. If the periodicity meets the resonant condition exactly, the power transferred is 100% over a sufficiently long fiber, regardless of the strength or weakness of the perturbation. The strength of the perturbation determines only the beat length, i.e., how long a section of fiber is necessary for 100% transfer.

As discussed above, the invention's key to using such a fiber is a means to selectively reestablish coupling between the non-identical cores in a controlled fashion along desired portions of the length of the fiber. To couple different modes, scattering from a periodic structure can be used. The invention makes use of a basic electromagnetic phenomenon closely related to the physics of Bragg scattering. A periodic variation of refractive index (essentially a phase grating) is distributed axially along the fiber. If the periodicity of this variation is chosen correctly, the electromagnetic field of core 10 will be coupled to that of core 12. An axial grating acts to rematch the optical phase of the modal fields, allowing evanescent wave coupling.

Only one particular well-defined periodicity of index variation in the region between the cores induces coupling. Because of this resonant effect, light is not coupled by random perturbations of the asymmetric dual core fiber, including bending, mechanical strain, temperature variation or other means, unless by accident the perturbation takes place at precisely the resonant spatial periodicity. However, any source of index perturbation which is present at this periodicity causes coupling. Hence, this inventive method contains an intrinsic means for controlling and manipulating the intercore coupling in a highly specific way which automatically tends to exclude many noise sources.

The invention, in order to manifest the unequal parallel cores as a sensor, utilizes a sensitive coating transduction mechanism through which environmental influences of a selected kind act to produce the periodic axial index variation which couples the cores. In the case of single core, single-mode fiber interferometers, metallic coatings have been used for magnetic sensors (nickel) and temperature sensors (aluminum). Even more sensitive magnetic sensors have been made using metallic glasses (metglass). Electric field sensors use piezoelectric or organic electric materials such as PVF2. A wide range of organic coatings, such as Hytrel and other plastics, have been used to make pressure and sound sensors.

Figure 4A:
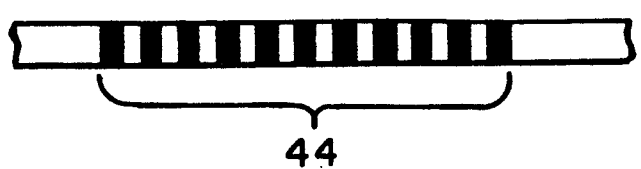
FIGS. 4a through 4i illustrate examples of variations in the pattern of the bands of coating of the dual core fiber.

Referring now also to FIGS. 4a–4i, there are shown examples of coating patterns that may be applied to the fiber to control the coupling for a variety of purposes. Such coatings may be applied by techniques known in the art, such as CVD (during or after fiber draw) vacuum evaporation, electroless coating, and the like. Coating patterns are formed by removing selected portions by photolithographic techniques. In FIG. 4a, the simple basic pattern 44 of sharp bands is shown. FIG. 1 shows that coating patterns 14, 16 and 18 may be formed of different material so that different sections of the fiber have different types of sensitivity. For example, coated sections 14, 16 and 18 could be employed as a magnetic sensor, a temperature sensor and a pressure sensor, respectively. Alternatively, information of one type may be gathered from several distributed locations.

Figure 4B:
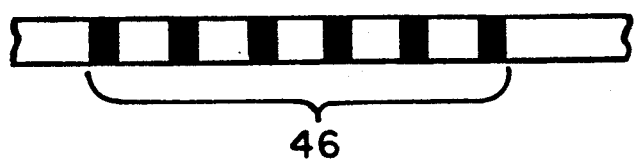

FIG. 4b illustrates a situation in which the desired space between pattern repetitions, $\pi = 2\pi/\Delta b$, represents such a small dimension that fabricating such a pattern becomes difficult. In this case, an alternative pattern 46 with three times the distance between patterns, 3A, can be used, since this square-wave pattern has Fourier components not only at the fundamental 3A but also at the third harmonic, so that $\frac{1}{3} \times 3A = A$. Thus, coupling is effected with a more convenient periodicity.

Figure 4C:
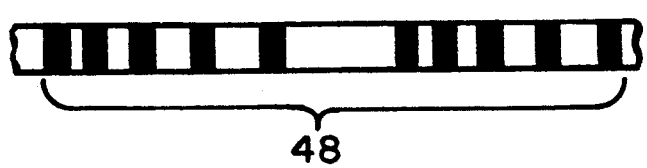
Figure 4D:
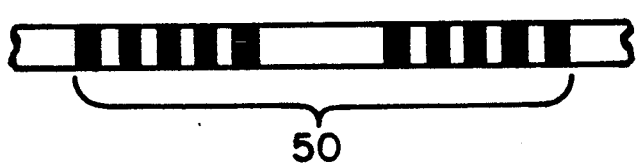

FIGS. 4c and 4d illustrate how techniques usually applied in the time domain can be carried into the space domain of coating patterns. In case a coating is required with a broader spread of spacial frequencies, the pattern 48 can be "chirped" by applying the bands with a period that varies linearly with distance, as in FIG. 4c.

If it is desired to produce a coating with a narrower band of spatial frequencies than in a simple square wave coating, the sensor cable may be provided with pattern 50 of FIG. 4d wherein blocks of bars are separated by blocks without coating, similar to the "Ramsey separated field method in atomic physics.

Figure 4E:
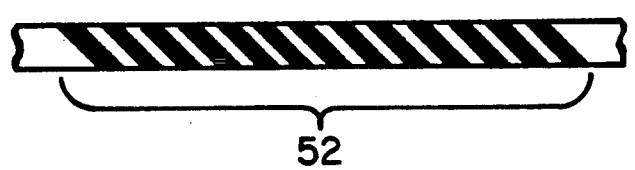

FIG. 4e illustrates that the coating pattern may be a continuous helix 52 instead of in parallel bands.

Figure 4F:
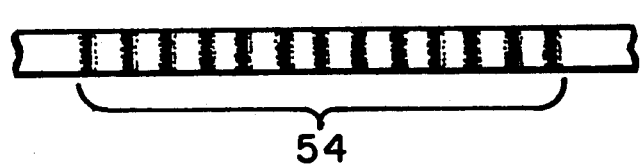

FIG. 4f illustrates a "shaded" coating 54 in which the thickness of sensitive material is deposited in a graded fashion to produce a true sine wave instead of discrete bands. The patterned coating can be deposited by vacuum evaporation. A mask of parallel slots, not shown, is placed under the fiber. The vapor source is placed under the mask. The vapor that passes thorough the slots forms the coating sections.

Figure 4G:
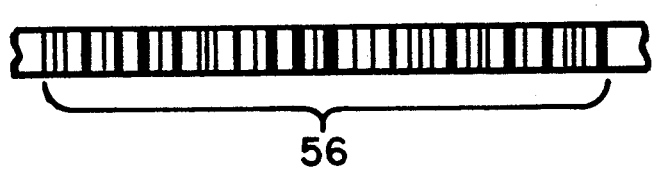

FIG. 4g illustrates how two distinct patterns of bands with different inter-pattern spacings can be superimposed to form a composite band 56, providing an alternative method of producing a broader Fourier spectrum or matching two distinct resonances.

Figure 4H:
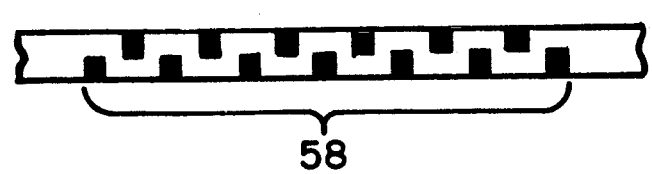

FIG. 4h shows that patterns need not be radially symmetric as in the case of interdigitated bands 58. Dual core fibers at some operating points can be more sensitive to asymmetric strains than to symmetric ones.

Figure 4I:
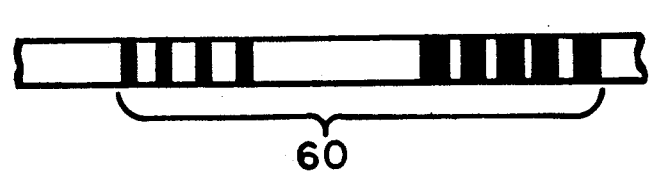

FIG. 4i illustrates a pattern 60 having variations in the band width-to-period ratio. This represents another means of controlling the Fourier components present in specific ways.

The invention's utilization of sensitive coatings requires analysis of the deformation of the coating and the interior of the fiber. The strained coating is taken as a boundary condition which provides a pressure $-P$ on the outer surfaces of an infinite sequence of bands 44 on a radius $D/2$, spaced by a periodicity A chosen to match $\Delta b = b_1 - b_2$ according to $A = 2\pi/\Delta b$; the width of the bands is equal to the space between them, $A/2$. Given this boundary condition, one may calculate the radial stress $\sigma_r$, tangential stress $\sigma_\Theta$, radial strain $\epsilon_r$, tangential strain $\epsilon_\Theta$, shear stress $\tau_{rz}$, shear strain $\gamma_{rz}$ and radial displacement u throughout the interior of the fiber. It is thought that such calculations have not been carried out for the case of a fiber undergoing a periodic strain applied at the surface.

Problems of elastic stress and strain in homogeneous isotropic materials can be analyzed in terms of a stress function $\phi$, which satisfies the biharmonic equation $$\nabla^2 \nabla^2 \phi = 0 \tag{Eq. 18}$$

$$\left( \frac{\partial^2}{\partial r^2} + \frac{1}{r} \frac{\partial}{\partial r} + \frac{\partial^2}{\partial z^2} \right)\left( \frac{\partial^2}{\partial r^2} + \frac{1}{r} \frac{\partial}{\partial r} + \frac{\partial^2}{\partial z^2} \right) \phi = 0$$

in cylindrical coordinates.

Using this together with the equilibrium conditions and equations of compatibility gives $$\sigma_r = \frac{\partial}{\partial z}\left( V_g \nabla^2 \phi - \frac{\partial^2 \phi}{\partial r} \right) \tag{Eq. 19}$$

$$\sigma_\Theta = \frac{\partial}{\partial z}\left( V_g \nabla^2 \phi - \frac{1}{r} \frac{\partial^2 \phi}{\partial r} \right)$$

$$\sigma_z = \frac{\partial}{\partial z}\left( (2 - V_g) \nabla^2 \phi - \frac{\partial^2 \phi}{\partial z} \right)$$

$$\tau_{rz} = \frac{\partial}{\partial r}\left( (1 - V_g) \nabla^2 \phi - \frac{\partial^2 \phi}{\partial z^2} \right)$$

where $V_g$ is Poisson's ratio for glass.

Using an expansion of all relevant quantities in Fourier series of harmonics of the fundamental axial spatial frequency $2\pi/A$ and neglecting shear stress as small, standard methods of mathematical physics and elasticity theory may be used to derive expressions for the Fourier components of each stress and displacement. These solutions are:

$$\sigma_r(r,z) = \left[ \left( -\frac{2P}{\pi} \sin \Omega z \right) \frac{I_1(\Omega r)}{I_1(\Omega R)} \right] \tag{Eq. 20}$$

$$\left[ \frac{\left[ -2(1 - V_g) - \Omega^2 r^2 - \Omega R \frac{I_0(\Omega R)}{I_1(\Omega R)} \right] R + \left[ 1 + \Omega R \frac{I_0(\Omega R)}{I_1(\Omega R)} \right] \Omega R \frac{I_0(\Omega r)}{I_1(\Omega r)} }{-2(1 - V_g) - \Omega^2 R^2 \left[ 1 - \left( \frac{I_0(\Omega R)}{I_1(\Omega R)} \right)^2 \right] } \right]$$

$$\sigma_\Theta(r,z) = \left[ \left( -\frac{2P}{\pi} \sin \Omega z \right) \frac{I_1(\Omega r)}{I_1(\Omega R)} \right] \tag{Eq. 21}$$

$$\left[ \frac{\left[ 2(1-V_g) + \Omega R \frac{I_0(\Omega R)}{I_1(\Omega R)} \right] \frac{R}{r} + (2V_g - 1)\Omega R \frac{I_0(\Omega r)}{I_1(\Omega r)}}{-2(1-V_g) - \Omega^2 R^2 \left[ 1 - \left( \frac{I_0(\Omega R)}{I_1(\Omega R)} \right)^2 \right]} \right]$$

$$\sigma_z(r_1 z) = \left[ \left( -\frac{2P}{\pi} \sin \Omega z \right) \frac{I_1(\Omega r)}{I_1(\Omega R)} \right] \quad \text{(Eq. 22)}$$

$$\left[ \frac{\Omega^2 Rr + \left[ 2 - \Omega R \frac{I_0(\Omega R)}{I_1(\Omega R)} \right] \Omega R \frac{I_0(\Omega r)}{I_1(\Omega r)}}{-2(1-V_g) - \Omega^2 R^2 \left[ 1 - \left( \frac{I_0(\Omega R)}{I_1(\Omega R)} \right)^2 \right]} \right]$$

$$\tau_{rz} = \left[ \left( -\frac{2P}{\pi} \cos \Omega z \right) \frac{I_1(\Omega r)}{I_1(\Omega R)} \right] \quad \text{(Eq. 23)}$$

$$\left[ \frac{\Omega^2 R^2 \frac{I_0(\Omega R)}{I_1(\Omega R)} - \Omega^2 Rr \frac{I_0(\Omega r)}{I_1(\Omega r)}}{-2(1-V_g) - \Omega^2 R^2 \left[ 1 - \left( \frac{I_0(\Omega R)}{I_1(\Omega R)} \right)^2 \right]} \right]$$

$$u(r_1 z) = \left[ R \left( -\frac{2P(1+V_g)}{E_g} \right) \sin \Omega z \frac{I_1(\Omega r)}{I_1(\Omega R)} \right]$$

$$\left[ \frac{2(1-V_g) + \Omega R \frac{I_0(\Omega R)}{I_1(\Omega R)} - \Omega r \frac{I_0(\Omega r)}{I_1(\Omega r)}}{-2(1-V_g) - \Omega^2 R^2 \left[ 1 - \left( \frac{I_0(\Omega R)}{I_1(\Omega R)} \right)^2 \right]} \right] \quad \text{(Eq. 24)}$$

$$\epsilon_r(r_1 z) = \left[ R \left( -\frac{2P(1+V_g)}{E_g} \right) \sin \Omega z \right]$$

$$\left[ \frac{\Omega I_0(\Omega r) \left[ (1-2V_g) + \Omega R \frac{I_0(\Omega R)}{I_1(\Omega R)} \right] - I_1(\Omega r) \left[ \Omega^2 r + \frac{1}{r} \left( 2(1-V) + \Omega R \frac{I_0(\Omega R)}{I_1(\Omega R)} \right) \right]}{(I_1(\Omega R)) \left\{ -2(1-V_g) - \Omega^2 R^2 \left[ 1 - \left( \frac{I_0(\Omega R)}{I_1(\Omega R)} \right)^2 \right] \right\}} \right]$$

$$w(r_1 z) = \left[ R \left( \frac{2P(1+V_g)}{E_g} \right) \cos \Omega z \frac{I_1(\Omega r)}{I_1(\Omega R)} \right]$$

$$\left[ \frac{\Omega r + \left[ 2(1-V_g) - \Omega R \frac{I_0(\Omega R)}{I_1(\Omega R)} \right] \frac{I_0(\Omega r)}{I_1(\Omega r)}}{-2(1-V_g) - \Omega^2 R^2 \left[ 1 - \left( \frac{I_0(\Omega R)}{I_1(\Omega R)} \right)^2 \right]} \right] \quad \text{(Eq. 25)}$$

$$\epsilon_z(r_1 z) = \left[ R \left( \frac{2P(1+V_g)}{E_g} \right) \cos \Omega z \right]$$

$$\left[ \frac{\Omega^2 r I_0(\Omega r) + \Omega I_1(\Omega r) \left[ 2(1-V_g) - \Omega R \frac{I_0(\Omega R)}{I_1(\Omega R)} \right]}{(I_1(\Omega R)) \left\{ -2(1-V_g) - \Omega^2 R^2 \left[ 1 - \left( \frac{I_0(\Omega R)}{I_1(\Omega R)} \right)^2 \right] \right\}} \right]$$

where

Ω is the spatial frequency of this Fourier component, r is the radial position inside the fiber, $0 \leq r \leq R$, R is the fiber radius (do not confuse with $R_\Omega$ used earlier), z is axial position, $V_g$ is Poisson's ratio for glass, assumed to be about constant for the core and cladding, $E_g$ is Young's modulus for glass, assumed to be about constant for core and cladding, P is the maximum pressure at the surface due to periodic coating pattern, and $I_0$ and $I_1$, are modified Bessel functions.

An improved understanding of the invention may be gained by evaluating some of these expressions numerically under assumptions of typical values for the parameters $V_g = 0.17$. For example, FIGS. 5a and 5b represent calculations of the radial stress component.

FIG. 5a shows the fraction of the radial stress component penetrating from the surface of the fiber (radius $r = R$) at which it is applied by a periodic coating into the center of the fiber ($r = 0$) at which location it is effective in coupling the cores. The penetration efficiency is plotted as a function of the ratio of pattern period A to the outer radius of the fiber R. As shown in this example, 89% of the pressure penetrates from the surface to center if the periodicity of the coating is equal to twice the fiber diameter, but only 46% penetrates if the period is equal to the fiber diameter, and only 5% if the period is half the fiber diameter. (The width of a coating band is one half the period A.) Coating periodicity is therefore preferably equal to or greater than the diameter of the fiber.

Figure 5B:
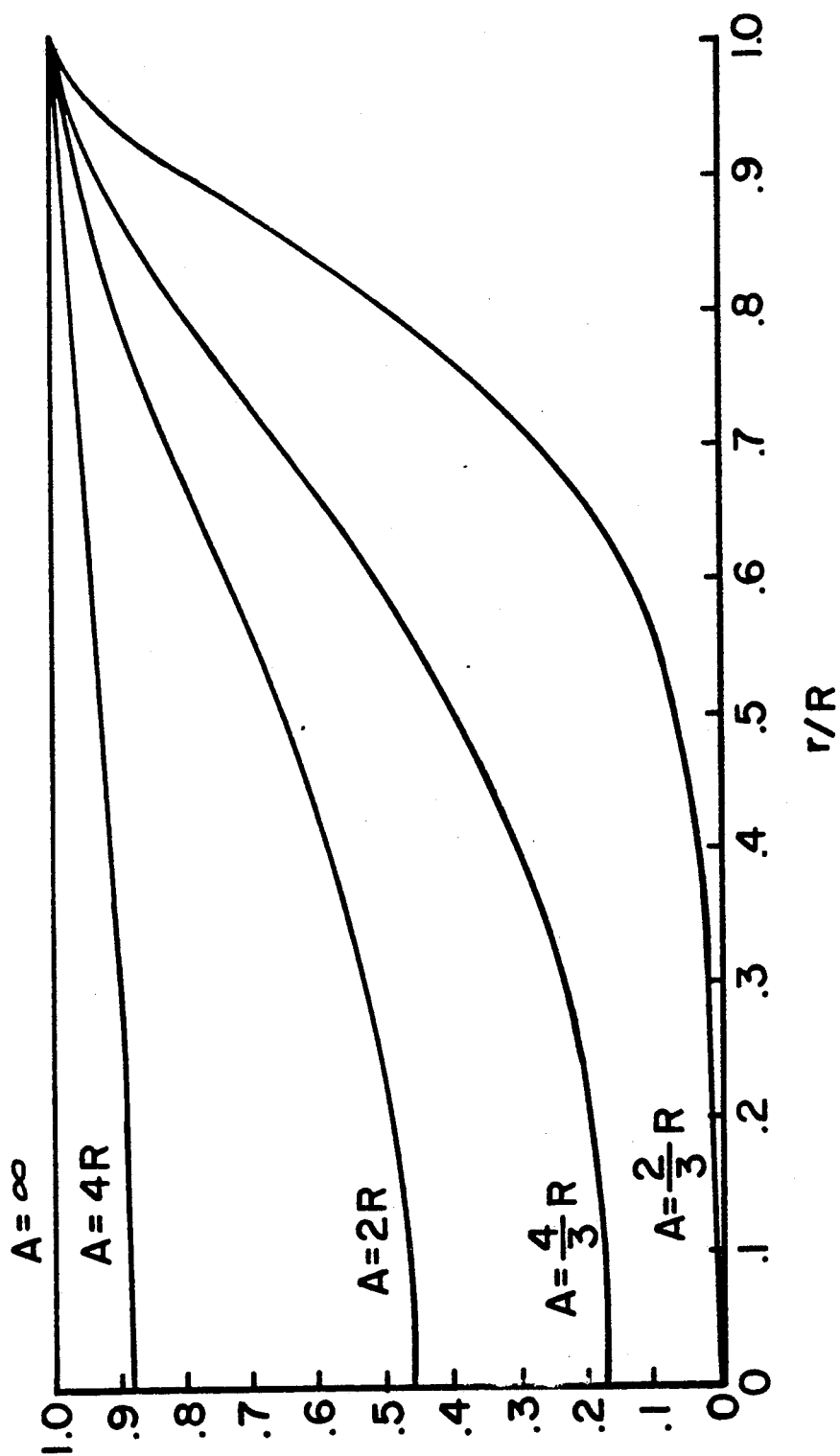

FIG. 5b shows the radial component of stress inside an optical fiber coated with a sinusoidal coating of period A, plotted as a function of radial position from fiber center ($r = 0$) to the surface ($r = R$). The stress is represented as a fraction of the maximum value of the surface pressure at any axial point z, plotted for various ratios A/R.

FIGS. 5a and 5b illustrate that forces induced by a periodic coating are only effective in penetrating the body of the fiber if the periodicity A of the pattern is equal to or greater than approximately the fiber diameter. This is a significant constraint in designing such fibers, because the desired resonant periodicity A is determined in connection with the difference in the electromagnetic propagation parameters of the two cores, $2\pi/A = \Delta b$, whereas practical values of fiber diameter are set by considerations of fragility and manufacturing methods. In practice the thinnest possible dual core fiber is desirable. Its diameter effectively sets the minimum usable A; hence $\_b$ is also fixed thereby.

In analyzing the invention, it is necessary next to utilize the elasticity information calculated above to predict the sensitivity of the sensor to particular fields F and responsive coatings.

Using Hooke's law in cylindrical coordinates, $\epsilon_r = 1/E_g[\sigma_r - v_g(\sigma_\Theta + \sigma_z)]$ $\epsilon_\Theta = 1/E_g[\sigma_\Theta - v_g(\sigma_r + \sigma_z)]$ $\epsilon_z = 1/E_g[\sigma_z - v_g(\sigma_r + \sigma_{\&3})]$ The pressure P referred to in all the elastic solutions has as its source a coating material of thickness t and Young's modulus E-coating, $E_c$, applied on the fiber surface at radius R. The pressure induced by such a coating when strained by a fraction $\epsilon_c$, is $$P = \frac{t}{R} \epsilon_c E_c \qquad \text{(Eq. 26)}$$

where $E_c$ is the Young's modulus of the coating material, t is the coating thickness and R is the fiber radius.

With the elasticity information now developed, it is possible to relate the sensing-induced surface strain in a coating to the modulation of refractive index in the cores, the modulation of intercore separation ratio d/a, and the overall longitudinal fiber stretch in the presence of a signal, all of which contribute to the signal response of the invention.

The quantity which is actually measured is the change in balance of optical power between cores in response to a change in signal field F. From Eqs. 15–17 assuming that the on-resonance condition $A = 2\pi/\Delta b$ is precisely met, the energy in the second core is $\sin^2(\delta(c)z/2)$, where $$\delta(c) = \frac{\partial c}{\partial(d/a)} \delta(d/a) + \frac{\partial c}{\partial n} \delta n$$

where c is the unperturbed coupling constant.

Here $\delta(c)$ is the differential coupling coefficient and c is the identical-core coupling coefficient of Eq. 2 which now plays the role merely of a scale-setting parameter since the fiber no longer couples over length $\pi/c$, but rather over the longer length $\pi/\delta(c)$. Referring to $\lambda_b^o = \pi/c$ as the "static beat length" and $\pi_b^D$ as the dynamic or sensing beat length, which varies from infinity at $F = 0$ to $\pi/\delta(c)$ at a given F:

$$\lambda_b^{DYNAMIC} = \lambda_b^o \left( \frac{c}{\delta(c)} \right) \qquad \text{(Eq. 27)}$$

If a length L of the coated fiber is active as a sensor with respect to field F, it may be defined by a dynamic differential beat phase $d\phi$ in analogy with the optical phase of fiber interferometric sensors:

$$\delta(c) = \int^F dF \frac{\partial c}{\partial F} \text{ and } d\phi = d(Lc) = d(\pi L/\lambda_b^o)$$

The quantity representing sensitivity is then the change in beat phase per unit change in signal:

$$\begin{aligned}\frac{d\phi}{dF} &= c \frac{\partial L}{\partial F} + L \frac{\partial c}{\partial F} \\ &= \frac{\pi L}{\lambda_b^o} \frac{1}{L} \frac{\partial L}{\partial F} + \frac{\pi L}{\lambda_b^o} \frac{1}{c} \frac{\partial c}{\partial(d/a)} \frac{\partial(d/a)}{\partial F} + \\ &\quad \frac{\pi L}{\lambda_b^o} \frac{1}{c} \frac{\partial c}{\partial n} \frac{\partial n}{\partial F}\end{aligned} \qquad \text{(Eq. 28)}$$

The first term represents the overall lengthening of the fiber with signal changes. This is not a resonant coupling mechanism of the unique inventive method type, but a simple mechanical effect altering the dual core optical path.

The second and third terms represent the change in resonant coupling strength per unit signal due to periodic elastic deformation from the coatings. The second term represents periodic modulation of the intercore separation distance. The third term represents coupling due to periodic modulation of the core refractive index. This is the mechanism referred to herein as "the inventive method mechanism". In order to analyze each of these three contributions below, it is necessary to make assumptions about the geometry and material parameters concerning the fiber and coating. Therefore the estimates below are exemplary of the operation of the invention.

FIRST TERM OF EQ. 28—Change of length with elastic deformation:

The quantity dL/L is recognized as the total axial strain. As discussed above the axial strain in the glass fiber caused by the surface coating undergoing a strain $\epsilon_c$ is computed in two parts: the periodic strain $\epsilon_z$ given by Eq. 25, plus the constant average strain $\epsilon_z^o$. By inspecting Eq. 25, it may be determined that the periodic strain $\epsilon_z$ vanishes at the center of the fiber r=0, in the neighborhood of the cores. Also, the periodic strain averages to zero over a length L of fiber. Hence, only the constant average internal component is effective:

$$\epsilon_z^o = -\frac{V_g P}{E_g}$$

where, from Eq. 26, the pressure is given by $$P = \frac{t}{R} \epsilon_c E_c$$

Thus the first term in the beat phase variation is $$\frac{\pi L}{\lambda_b^o} \left( -\frac{V_g}{E_g} \right) \frac{t}{R} E_c \left( \frac{\epsilon_c}{dF} \right)$$

where
$V_g$=Poisson ratio silica
$E_g$=Young's modulus of silica
t=thickness of coating
R=radius of fiber
$E_c$=Young's Modulus (coating)
$\epsilon_c$=coating strain
$\lambda_b^o = \pi/2c$.

Here the quantity $\epsilon_c/dF$ is the strain in the coating per unit sensed field F, i.e., the coefficient of linear expansion of the coating material with respect to F. As an example, this coefficient may be the magnetostrictive coefficient of a nickel coating.

SECOND TERM OF EQ. 28—Periodic variation of intercore separation with elastic deformation:

Carrying out the derivatives indicated relative to a model fiber with dual parallel rod waveguides so that $$c = \frac{\lambda}{2\pi n_1} \frac{U^2}{aV^2} \frac{K_0(w(d/a))}{K_1^2(w)}$$

and using various properties and Bessel functions well known to mathematicians, it may be shown that the second term becomes $$\frac{\pi L}{\lambda_b^o} \left[ -w \frac{K_1(wd/a)}{K_0(wd/a)} \right] \left[ -4 \frac{P(1+V_g)}{E_g} \frac{R}{a} \frac{1}{dF} < \ldots > \right] \quad \text{(Eq. 29)}$$

where $<\ldots>$ stands for the value of a numerical factor to be evaluated by calculating a complex expression involving Bessel functions.

In order to evaluate Eq. 29 it is necessary to specify design parameters for the fiber. The values shown below have been used in the preferred embodiment.

V=2.25, corresponding to W=1.55, and d/a=4.

Using these values and evaluating the modified Hankel functions $K_0$ and $K_1$, it is found $$-w \frac{K_1(wd/a)}{K_0(wd/a)} = -1.55 \frac{K_1(6.2)}{K_0(6.2)} = -1.67$$

This computation is non-critical since the ratio $K_1(x)/K_0(x)$ changes very slowly with $1 < x < 10$. The main sensitivity here is to the value of W, hence of V and n.

To evaluate the radial displacement numerical factor $<\ldots>$, it is also necessary to specify a core radius a, fiber radius R, and coating periodicity A. As noted in earlier sections, R=40 microns is the thinnest practical fiber. The corresponding smallest useful periodicity A=80 microns (period of pattern ≈ diameter of fiber). Then $\Omega = 2\pi/80\mu$ and $\Omega R = n$.

The radial displacement is to be evaluated at r=the center of one core in relation to the fiber center. The core radius a=1 micron. Then, if d/a=4 the distance r from fiber center to core center is 2 microns.

$$r = d/2 = 2 \ \mu m.$$

Thus $r/R = 0.05$ and $\Omega r = 2\pi/40 = 0.1571$.
$V_g = 0.1702$.

The numerical factor $<\ldots>$ is then evaluated using the values of the modified Bessel functions with the result $<\ldots> = 0.0291$.

Combining all the numerical factors and noting also that R/a=40, the second term of Eq. 27 is evaluated for the fiber parameters as specified:

$$(3.28) \frac{\pi L}{\lambda_b^o} \frac{1+V_g}{E_g} \frac{t}{R} E_c \frac{\epsilon_L}{dF} \quad \text{(Eq. 30)}$$

THIRD TERM OF EQ. 28—Sensitivity due to modulation of core refractive index n due to elastic deformation:

The last term in Eq. 28 is the sensitivity of the beat phase to differential changes in the refractive index of the cores due to elastic deformation by the periodic coating:

$$(Lc) \left| \frac{1}{c} \frac{\partial c}{\partial n} \right| \left| \frac{\partial n}{\partial F} \right| \quad \text{(Eq. 31)}$$

where n is the core refractive index. Each of the two principal factors is considerably more involved to evaluate than for the previous terms of the sensitivity.

The factor representing the derivative of the coupling coefficient with respect to n is complicated by the fact that U, V, W and the arguments of the two modified Bessel functions all implicitly contain n:

$$c = \frac{\lambda}{2\pi n} \frac{U^2}{a^2 V^2} \frac{K_0(Wd/a)}{K_1^2(W)} \quad \text{from (Eq. 2)}$$

-continued $$V = \frac{2\pi}{\lambda} a \sqrt{n^2 - N^2}$$

$$U = (1 + \sqrt{2})V[1 + (4 + V^4)^{\frac{1}{4}}]^{-1}$$

$$W = \sqrt{V^2 - U^2}$$

The derivatives may be computed with the aid of identities well known in the art and evaluated numerically.

As discussed above, the choice of $d/a = 4$ is indicated; a numerical study with this and other parameters as chosen earlier leads to an optimum sensitivity at $V = 2.24$, at which:

$$\frac{1}{c} \frac{\partial c}{\partial n} = 3.52 \times 10^2$$

$$V = 2.24, d/a = 4, n = 1.55$$

The second factor in Eq. 31 relates index variations to the sensed field via the intermediary of strains in the fiber. The translation of strains into index modulations involves the photoelastic effect, which has been analyzed for light propagating in fibers as is well known in the art.

Index modulations are related to strains via the 6×6 strain optic tensor $$\Delta\left(\frac{1}{n^2}\right)_{ij} = p_{ijkl}\epsilon_{kl}$$

which in the case of an isotropic homogeneous material is symmetric and has only three independent components:

$$p = \begin{bmatrix} P_{11} & P_{12} & P_{12} & 0 & 0 & 0 \\ P_{12} & P_{11} & P_{12} & 0 & 0 & 0 \\ P_{12} & P_{12} & P_{11} & 0 & 0 & 0 \\ 0 & 0 & 0 & P_{44} & 0 & 0 \\ 0 & 0 & 0 & 0 & P_{44} & 0 \\ 0 & 0 & 0 & 0 & 0 & P_{44} \end{bmatrix} \quad \text{(Eq. 32)}$$

where $p_{12} = p_{11} - 2p_{44}$, $\epsilon_r = \epsilon_{11}$, $\epsilon_\Theta = \epsilon_{22}$, $\epsilon_z = \epsilon_{33}$.

For a beam propagating in the z direction, the symmetries of this matrix are used to write the index variation in terms of just two strains in the glass, the radial strain $\epsilon_r$ and the axial strain $\epsilon_z$, and two Pockel's (elastooptic) coefficients:

$$\frac{\Delta n}{n} = -\frac{n^2}{2}[\epsilon_r(p_{11} + p_{12}) + \epsilon_z p_{12}] \quad \text{(Eq. 33)}$$

For fused silica, $p_{11} = 0.126$ and $p_{12} = 0.27$, $n = 1.55$.

The relevant strain components $\epsilon_r$ and $\epsilon_z$ as induced by a periodic surface pressure P are then available from Eqs. 24 and 25. While the internal radial strain is proportional to sin ($\Omega z$), in phase with the surface strain, the internal axial strain $\epsilon_z$ is proportional to cos ($\Omega z$), out of phase but still at the resonant spatial frequency. Using the stated design parameters and evaluating the Bessel function expressions which result, it is found that $$\epsilon_r\bigg| = \sin \Omega z \frac{-2P(1 + V_g)}{E_g} \quad <0.39112> \quad \text{(Eq. 34)}$$
$$r = 2 \ \mu m, \Omega r = 1.57$$

$$\epsilon_z\bigg| = \cos \Omega z \frac{+2P(1 + V_g)}{E_g} \quad <-0.0588>$$
$$r = 2 \ \mu m, \Omega r = 1.57$$

Approximately 39% of the surface coating strain is communicated to the cores $r/R = 2/40$ in the form of radial strain, but only about 6% is communicated into axial strain.

Using the Pockel's coefficients for silica in Eq. 33, the index variation becomes $$\frac{\Delta n}{n} = \frac{P(1 + V_g)}{E_g}[(0.3302) \sin \Omega z + (0.0338) \cos \Omega z]$$

. This estimate teaches that the radial strain contributes ten times more to the sensor response than the axial strain.

Finally, it may be shown $$\frac{\Delta n}{n} = \frac{P(1 + V_g)}{E_g}(0.3302) \sin (\Omega z + \Theta_o) \quad \text{(Eq. 35)}$$

$$\frac{\partial n}{\partial F} = (0.485)\frac{(1 + V_g)}{E_g}\frac{P}{dF}$$

in which the phase $\Theta_0$ is a constant and hence irrelevant.

The three terms of the differential beat phase sensitivity may now be collected and combined (using the glass Poisson's ratio $V_g = 0.1702$):

$$\frac{d\phi}{dF} = [(-0.17) + (3.84) + (199.8)]\frac{\pi L}{\lambda_b{}^o}\frac{E_c}{E_g}\frac{t}{R}\frac{\epsilon_c}{dF} \quad \text{(Eq. 36)}$$

The meaning of these terms may be appreciated if the fiber whose coating contracts by a linear fraction $\epsilon_c$ under the influence of a change dF in the sensed field is considered. The first and smallest term represents the overall increase in fiber length as the fiber responds to the collective contractions of the coating bands with a longitudinal extension, which in effect decreases the beat phase. The second term represents the resonant coupling effect caused when the periodic strain pattern produces a periodic variation in intercore separation, increasing the beat phase. The third and by far largest term represents the resonant coupling mechanism in which the pattern of strain bands modulates the refractive indices in the cores at the correct period.

The first term cancels a small part of the other two effects. Ideally, no resonant coupling takes place if F is zero, so the relative beat phase increases much faster with signal than does the optical phase in the Mach-Zehnder interferometric sensor.

Thus the total sensitivity of a coated fiber 20 in accordance with the present invention, when configured with the particular design parameters needed for various uses, is effectively due to periodic index modulation:

$$\frac{d\phi}{dF} = (203.5)\frac{\pi L}{\lambda_b{}^o}\frac{E_c}{E_g}\frac{t}{R}\frac{\epsilon_c}{dF} \quad \text{(Eq. 37)}$$

where
- φ = beat phase
- L = length of coated section
- $\lambda_b^o$ = beat length if cores were identical = $\pi/2c$
- $E_c$ = Young's modulus of coating
- $E_g$ = Young's modulus of glass fiber
- t = thickness of coating
- R = radius of glass fiber
- $\epsilon_c/dF$ = linear coefficient of expansion of the coating material per unit field F.

Next, the dynamic beat length $\lambda_b^D$ may be found from its definition in Eqs. 27 and 28

$$\frac{\lambda_b^D}{\lambda_b^o} = \frac{c}{\delta(c)}; \delta(c) = \int^F dF \frac{\partial c}{\partial F} \quad \text{(Eq. 38)}$$

$$\lambda_b^D = \lambda_b^o \left[ (203.64) \left( \frac{E_c}{E_g} \frac{t}{R} \epsilon_c F \right) \right]^{-1}$$

As defined above, the invention uses sensitive coatings as a transduction mechanism to the outside environment. The coatings are chosen to expand or contract in the presence of specific fields. By doing so they indirectly produce a pattern of internal strains, and hence index variations, inside the fiber.

Using this mechanism, an interferometric fiber magnetic field sensor can be made by coating the fiber with a magnetostrictive material such as nickel, an electric field sensor by use of piezoelectric coating materials, a sound wave or pressure sensor by use of plastic coatings, and a temperature sensor by use of aluminum.

Knowing that sensitive coatings can impress a useful strain into a glass fiber, the inventive method uses the periodic strain/index grating required to couple two asymmetric cores created by applying such coatings not in the usual uniform fashion, but rather in periodic patterns of bands on the fiber surface. The coating then acts to transduce a specific field (e.g., magnetic, pressure, temperature) into an axial index grating within the fiber whose modulation depth is proportional to the signal of interest, and whose spatial periodicity is chosen to satisfy the resonant condition required to produce intercore phase matching. Thus the intercore evanescent wave coupling responds to the signal through the medium of the coating.

While the invention has been described with reference to specific embodiments, the description is illustrative and is not to be construed as limiting the invention. Various modifications and applications may occur to those skilled in the art without departing from the true spirit and scope of the invention as defined by the appended claims.

What is claimed is:

1. A fiber optic sensing cable for guiding electromagnetic waves and for sensing a physical parameter or environmental field, said cable comprising:
   first and second single-mode cores disposed in a matrix of cladding material, said cores being separated solely by said cladding material, said first and second cores being in sufficiently close proximity to one another that they would normally experience evanescent wave coupling had they identical propagation constants, said cores having unequal propagation constants whereby evanescent wave coupling between them is substantially suppressed in the absence of said parameter or field, and
   sensing means disposed on the outer surface of said cladding material, said sensing means comprising a patterned coating, the periodic variation of which is at a spatial frequency which resonantly matches the difference in core propagation constants, whereby a resonant exchange of optical power is induced between said first and second cores for initiating coupling between said first and second cores when said physical parameter or environmental field is sensed.

2. The fiber optic sensing cable of claim 1 wherein said first and second cores have first and second unequal refractive indices, respectively, and said cladding has a third refractive index which is lower than either of said first or said second refractive indices.

3. The fiber optic sensing cable of claim 2 wherein said first and second cores are cylindrical cores, the radius of said second core being greater than that of said first core.

4. The fiber optic cable of claim 3 wherein said first and second cores are separated by a distance of less than 10 times the radius of said second core.

5. The fiber optic cable of claim 1 wherein said second core is substantially concentrically disposed with respect to said first core.

6. The fiber optic sensing cable of claim 5 wherein said first and second cores have a ring cross-section.

7. The fiber optic sensing cable of claim 1 wherein said sensing material comprises a first group of a plurality of spaced apart bands substantially perpendicular to the longitudinal axis of said cable.

8. The fiber optic sensing cable of claim 7 wherein the periodicity of the spacing of said bands is equal to or greater than the diameter of said fiber.

9. The fiber optic sensing cable of claim 8 further comprising a second group of bands adjacent to said first group and spaced a predetermined distance therefrom.

10. The fiber optic sensing cable of claim 1 wherein said cladding comprises a dado-like indentation parallel to said cable longitudinal axis.

11. The fiber optic sensing cable of claim 1 wherein said sensing material comprises a first group of a plurality of interdigitated half bands.

12. The fiber optic sensing cable of claim 11 wherein said sensing material comprises a second group of bands adjacent to said first group and spaced a predetermined distance therefrom.

13. The fiber optic cable of claim 1 wherein said first and said second core are separated by a distance of less than 10 times the radius of said second core.

14. The fiber optic cable of claim 1 further comprising means for sensing a change in light signal strength guided by one of said cores, resulting from a change in said physical parameter.

15. A fiber optic sensing cable for guiding electromagnetic waves and for sensing physical parameters comprising:
   a first single-mode core having a first refractive index;
   a second single-mode core proximately disposed with respect to said first core and having a second refractive index, said first and said second cores having unequal propagation constants;
   cladding surrounding each of said cores and having a third refractive index, said third refractive index being lower than either of said first or said second refractive indices; and coating means disposed on the outer surface of said cladding for communicating to said cores a pattern of elastic deformation having a periodic variation that is at a spatial periodicity which resonantly matches the difference in core propagation constants, thereby inducing a resonant exchange of optical power between said cores in proportion to the strength of the elastic deformation at the surface of said cladding.

16. The fiber optic sensing cable of claim 15 wherein said coating means comprises a first group of a plurality of spaced apart bands substantially perpendicular to the longitudinal axis of said cable and a second group of bands adjacent to said first group and spaced a predetermined distance therefrom.

17. A multiple cored fiber optic article comprising at least two parallel single-mode cores in sufficiently close proximity to one another so that they would normally experience evanescent wave coupling along their entire lengths had they identical propagation constants, said two cores having different refractive indices with respect to each other such that the two cores have unequal propagation constants, and said cores having mismatched optical phase fields wherein evanescent wave coupling is substantially suppressed, and whereby optical power launched into one of said two cores remains propagating within that core along over an extended length of said fiber optic article, cladding means adjacent said cores, and sensing means disposed on said cladding means along at least one portion of a length of said fiber optic article, for sensitizing said article to a predetermined parameter or environmental field, said sensing means comprising a patterned coating, the periodic variation of which is at a spatial frequency which resonantly matches the difference in core propagation constants, whereby a resonant exchange of optical power is induced between said two cores for initiating evanescent wave coupling between said cores when said predetermined parameter or environmental field is sensed.

18. The multiple cored optic fiber article of claim 17, said sensitizing means further being characterized as causing said optic fiber article to undergo a physical or mechanical alteration in response to said predetermined parameter or environmental field.

19. A multiple cored optic fiber article having at least two single-mode cores in sufficiently close proximity to one another so that they would normally experience evanescent wave coupling had they identical propagation constants, said two cores having different refractive indices with respect to each other such that the two cores have unequal propagation constants, and said cores having mismatched optical phase fields wherein evanescent wave coupling is substantially suppressed, and whereby optical power launched into one of said two cores remains propagating within that core alone over an extended length of said optic fiber article, and sensitizing means disposed along at least one portion of a length of said optic fiber article for sensitizing said optic fiber article to a predetermined parameter or environmental field and causing said optic fiber article to undergo a physical or mechanical alteration in response to said predetermined parameter or environmental field, said sensitizing means comprising a given length of coating disposed about said fiber optic article, said coating having a pattern, the spatial frequency of which resonantly matches the difference in core propagation constants, whereby a resonant exchange of optical power is induced between said first and second cores in response to said predetermined parameter or environmental field, said coating having materials chosen from a group consisting of: magnetostrictive material, piezoelectric material, electrostrictive material, heat conductive material, and pressure sensitive material.

20. The multiple cored optic fiber article of claim 19, wherein said coating is disposed about said fiber optic article in a geometrical pattern.

21. The multiple cored optic fiber article of claim 20, wherein said geometrical pattern comprises a periodic pattern of spaced-apart circular bands.

22. A system for guiding electromagnetic waves and sensing physical parameters comprising:
a first single-mode core having an input end and a first refractive index, said first core being proximately disposed with respect to a second single-mode core having an output end and having a second refractive index, said first and second refractive indices being unequal, said first and second cores having unequal propagation constants;
a light source operatively disposed with respect to said input end of said first core for producing optical energy;
a cladding surrounding each of said cores and having a third refractive index lower than the lesser of said first or said second refractive indices;
coating means disposed on the outer surface of said cladding for communicating to said cores a pattern of elastic deformation having a periodic variation that is at a spatial periodicity which resonantly matches the difference in core propagation constants to induce a resonant exchange of optical power between said cores in proportion to the strength of the elastic deformation at the surface of said cladding; and
detecting means operatively disposed with respect to said output end of said second core for detecting optical power.

23. The system of claim 22 further comprising:
a) first focusing means intermediate said light source and said first core for coupling optical power thereto; and
b) second focusing means intermediate said detecting means and said second core for coupling said exchanged optical power therefrom.

24. The system of claim 22 wherein said coating means comprises a first group of a plurality of spaced apart bands substantially perpendicular to the longitudinal axis of said cable.

* * * * *